United States Patent
Muskat et al.

(10) Patent No.: US 11,754,186 B2
(45) Date of Patent: Sep. 12, 2023

(54) GROUNDING BRUSH SEALS

(71) Applicant: Rolls-Royce North American Technologies, Inc., Indianapolis, IN (US)

(72) Inventors: James Christopher Muskat, Mooresville, IN (US); Sean Andrew Morgan, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 227 days.

(21) Appl. No.: 16/950,766

(22) Filed: Nov. 17, 2020

(65) Prior Publication Data

US 2022/0154829 A1    May 19, 2022

(51) Int. Cl.
*F16J 15/3288* (2016.01)
*H02K 5/124* (2006.01)
*H02K 11/40* (2016.01)

(52) U.S. Cl.
CPC .......... *F16J 15/3288* (2013.01); *H02K 5/124* (2013.01); *H02K 11/40* (2016.01)

(58) Field of Classification Search
CPC ....... H02K 5/124; H02K 11/40; F16J 15/3288
See application file for complete search history.

(56) References Cited

U.S. PATENT DOCUMENTS

| | | | |
|---|---|---|---|
| 4,399,337 A * | 8/1983 | Annis | H01H 3/16 277/355 |
| 4,600,202 A * | 7/1986 | Schaeffler | F16J 15/3288 277/939 |
| 5,106,104 A * | 4/1992 | Atkinson | F16J 15/3288 277/303 |
| 5,597,167 A * | 1/1997 | Snyder | F16J 15/3288 277/355 |
| 6,008,556 A * | 12/1999 | Ramthun | H02K 5/124 310/88 |
| 6,168,162 B1 | 1/2001 | Reluzco et al. | |
| 6,609,888 B1 * | 8/2003 | Ingistov | F16J 15/3288 415/113 |
| 6,669,202 B1 | 12/2003 | Aksit et al. | |
| 7,521,827 B2 | 4/2009 | Orlowski et al. | |

(Continued)

FOREIGN PATENT DOCUMENTS

JP   2015207533 A   11/2015

OTHER PUBLICATIONS

Helwig Carbon Products, Inc., Adjustable Ring Brush Holder, Mar. 2016, 2 pgs.

(Continued)

*Primary Examiner* — Eugene G Byrd
(74) *Attorney, Agent, or Firm* — Shumaker & Sieffert, P.A.

(57) ABSTRACT

The disclosure describes an apparatus for sealing a rotating machine, such as an electric machine or gas turbine engine. The apparatus includes a brush seal. The brush seal includes a plurality of first filaments and a plurality of electrically conductive filaments. The first filaments are configured to seal a lubricant within a bearing chamber or sump of the rotating machine. The plurality of electrically conductive filaments is configured to contact a shaft of the rotating machine and discharge a shaft voltage-induced current from the shaft to an external ground of the rotating machine.

18 Claims, 2 Drawing Sheets

(56) References Cited

U.S. PATENT DOCUMENTS

| | | | |
|---|---|---|---|
| 7,637,719 B2* | 12/2009 | Graebeldinger | F16J 15/3288 415/230 |
| 8,421,286 B2* | 4/2013 | Bossaller | H02K 11/40 310/239 |
| 9,634,547 B1 | 4/2017 | Orlowski et al. | |
| 10,927,897 B2* | 2/2021 | Roman | F16C 19/52 |
| 2006/0007609 A1 | 1/2006 | Oh et al. | |
| 2006/0250038 A1 | 11/2006 | Rea et al. | |
| 2007/0040459 A1 | 2/2007 | Oh | |
| 2008/0063831 A1* | 3/2008 | Kanzaki | E06B 7/22 156/72 |
| 2010/0171270 A1* | 7/2010 | Gail | F16L 27/0816 277/355 |
| 2011/0062818 A1* | 3/2011 | Oh | H02K 11/40 310/228 |
| 2011/0204734 A1 | 8/2011 | Orlowski et al. | |
| 2013/0277918 A1* | 10/2013 | Fitzgerald | F01D 11/00 277/355 |
| 2014/0097714 A1* | 4/2014 | Oda | H02K 5/1672 310/58 |
| 2017/0108047 A1 | 4/2017 | White et al. | |
| 2019/0081538 A1* | 3/2019 | Nye | H02K 11/026 |

OTHER PUBLICATIONS

Helwig Carbon Products, Inc., High Quality Aviation Brushes from Helwig, Jan. 2014, 1 pg.

Ali et al., "Small Turbogenerator Technology for Distributed Generation", Final Report for period Oct. 2000 to Sep. 2001, 101 pgs.

Eaton, Bearing Currents, Application Note AP040061E, Jan. 2014, 5 pgs.

Environmental Potentials, Reducing Motor Shaft Voltages, 2009, 10 pgs. (Applicant points out, in accordance with MPEP 609.04(a), that the year of publication, 2009, is sufficiently earlier than the effective U.S. filing date, so that the particular month of publication is not in issue.).

Nippes et al. "Understanding Shaft Voltage and Grounding Currents of Turbine Generators", 2005, 12 pgs. (Applicant points out, in accordance with MPEP 609.04(a), that the year of publication, 2005, is sufficiently earlier than the effective U.S. filing date, so that the particular month of publication is not in issue.).

Koenitzer et al., "Shaft Grounding and Sliding Electrical Contacts", Dec. 2016, 12 pgs.

SKF, Rolling bearings and seals in electric motors and generators, Aug. 2013, 146 pgs.

Aksit, "Evaluation of Brush Seals for Oil Sealing Applications", 2003, 10 pgs. (Applicant points out, in accordance with MPEP 609.04(a), that the year of publication, 2003, is sufficiently earlier than the effective U.S. filing date, so that the particular month of publication is not in issue.).

Office Action, and translation thereof, from counterpart French Application No. 2112037 dated Jan. 18, 2022, 4 pp.

Preliminary Search Report, and translation thereof, from counterpart French Application No. 2112037 dated Sep. 16, 2022, 14 pp.

* cited by examiner

_US 11,754,186 B2_

GROUNDING BRUSH SEALS

TECHNICAL FIELD

The present disclosure generally relates to assemblies and techniques for sealing and grounding rotating machines.

BACKGROUND

Rotating shafts and shaft components, such as rotors of electric machines, may be subject to shaft voltages. For example, stray voltages may be induced by shaft rotation linking asymmetric magnetism of electric machinery, by residual magnetism in a shaft or adjacent stationary components, or by switching of power electronics or exciters.

SUMMARY

The disclosure describes example assemblies and techniques for sealing a lubricant and grounding a rotating shaft of a rotating machine using a grounding brush seal.

In some examples, the disclosure describes an example apparatus including a brush seal. The brush seal includes a plurality of first filaments and a plurality of electrically conductive filaments. The first filaments are configured to seal a lubricant within a bearing chamber or sump of a rotating machine, such as an electric machine or gas turbine engine. The plurality of electrically conductive filaments is configured to contact a shaft of the rotating machine and discharge a shaft voltage-induced current from the shaft to an external ground of the rotating machine.

In some examples, the disclosure describes an example system, such as an electric machine or gas turbine engine, that includes a housing defining an axis, a shaft positioned along the axis, a stator coupled to the housing, and a rotor coupled to the shaft. The system includes a first shaft bearing and a second shaft bearing coupled to the housing and a bearing lubrication system fluidically coupled to the first and second shaft bearings. The first and second shaft bearings are each configured to contact the shaft to permit rotation of the shaft. The bearing lubrication system is configured to lubricate the first and second shaft bearings using a lubricant. The system includes a first shaft seal and a second shaft seal coupled to the housing. The first and second shaft seals are each configured to seal the lubricant within the bearing chambers or sumps. At least one of the first or second shaft seals comprises a brush seal configured to discharge a shaft voltage-induced current from the shaft to an external ground of the system.

The details of one or more examples are set forth in the accompanying drawings and the description below. Other features, objects, and advantages will be apparent from the description and drawings, and from the claims.

DETAILED DESCRIPTION

Figure 1A:
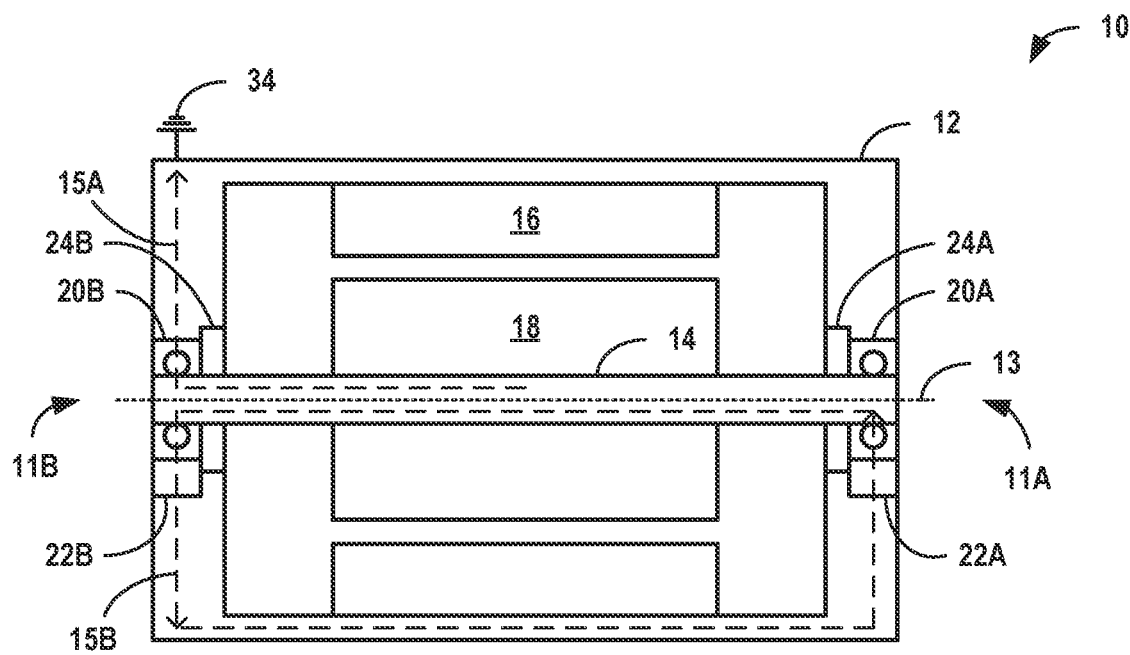
FIG. 1A is a cross-section side view diagram illustrating an example electric machine that includes one or more grounding brush seals.

The disclosure describes example assemblies and techniques for sealing and grounding a rotating shaft of a rotating machine, such as an electric machine or gas turbine engine, using a grounding brush seal. The rotating shaft of the rotating machine is positioned on shaft bearings that require lubrication from a lubricant, such as grease or oil, supplied by a lubrication system. One or more brush seals may be positioned along the rotating shaft outside (e.g., towards an axial end of) the shaft bearings to seal the lubricant into a housing of the rotating machine. Each brush seal includes a plurality of filaments configured (e.g., shaped, sized, and/or arranged) to conform to curvature of the shaft and substantially prevent the lubricant from leaving the bearing chambers of the shaft bearings and/or or sumps of the lubrication system through a gap between the housing and the shaft. These brush seals may be particularly useful for rotating machines operating under relatively low pressures and/or having relatively large diameter shafts and/or having relatively high shaft surface speeds.

As the shaft of the rotating machine rotates, stray voltages caused by leakage, induction, and/or capacitance from electrical components may generate currents in the shafts. For example, high voltages in a stator or a rotor of the electric machine may generate capacitive voltage in the shaft that exceeds a breakdown voltage of lubricant in the shaft bearings and generates currents through the rotating shaft. These shaft-voltage induced currents may discharge from the shaft to a ground or may circulate through the rotating machine. Shaft voltage-induced currents may reduce an efficiency of the rotating machine and/or may reduce an operating life of the rotating machine by damaging bearings, seals, gears, and other interface components of the rotating machine. For example, the shaft bearings may provide a path to ground or a circuit for the shaft voltage-induced currents by connecting the shaft to the casing of the rotating machine. Shaft currents that pass through the shaft bearings may create arcing between the shaft and the shaft bearings, which may heat the shaft bearings and cause pitting in surfaces of the shaft bearings. While insulated shaft bearings may raise a resistance of areas of contact from being a path for circulating currents to ground, the constant shaft voltage may lead to insulation breakdown or damaging current flow through other components.

In accordance with techniques of this disclosure, to reduce discharge of shaft currents in the rotating machine through the shaft bearings or other sensitive components, at least a portion of the plurality of filaments of the brush seal are conductive filaments. The conductive filaments are configured to contact the shaft and provide a conductive path through which to discharge the shaft voltage-induced currents from the shaft to an external ground of the rotating machine. For example, the brush seal may be coupled to a conductive conduit, such as a conductive strap, that is coupled to a mounting frame or other large conductive body external to the rotating machine. The conductive filaments provide a path of lower resistance to ground than the shaft bearings or other components between the rotating shaft and ground. During operation of the rotating machine, shaft currents induced by stray voltages in the shaft may travel through the conductive filaments and discharge from the rotating machine, thereby reducing a level of current in the shaft and, correspondingly, a likelihood of arcing in the shaft bearings of the rotating machine.

In this way, rotating machines, such as electric motors, electric generators, or gas turbine engines, incorporating brush seals described herein may increase longevity of the shaft bearings by both sealing the lubricant into the rotating machine and discharging shaft voltage-induced currents from the rotating machine. In some instances, rotating machines incorporating brush seals described herein may have reduced size and/or weight compared to rotating machines that do not include such brush seals. For example, other rotating machines may include one or more supplemental current discharge mechanisms configured to discharge shaft voltage-induced currents from the shaft. These supplemental current discharge mechanisms may add weight or shaft length to the rotating machine, and may increase complexity of maintenance of the shaft bearings, shaft seals, or other components involving the shaft.

FIG. 1A is a cross-section side view diagram illustrating an example rotating machine that includes one or more grounding brush seals. In the example of FIG. 1A, the rotating machine is illustrated and described as an electric machine 10; however, in other examples, a rotating machine may include a gas turbine engine or other machine that includes a rotating shaft and a potential for currents circulating or travelling through bearings supporting the rotating shaft. Electric machine 10 may include any electric machine configured to convert electrical energy to or from rotating mechanical energy including, but not limited to, electrical generators, electrical motors, and the like. Electric machine 10 may be used in a variety of applications including, but not limited to, electrical generation, propulsion, and the like. In some examples, electric machine 10 may be used in aircraft or watercraft applications in which space, weight, and longevity of components may be important for safety and/or efficiency, and in which opportunities for performing maintenance may be limited during operation.

Electric machine 10 includes a housing 12 defining an axis 13 and a pressurized boundary of electric machine 10. Housing 12 may be configured to house components of electric machine 10. Electric machine 10 includes a shaft 14 positioned along axis 13. Housing 12 includes one or more shaft openings through which shaft 14 may protrude from housing 12 and couple to a rotary mechanical device, such as a turbine (e.g., if electric machine 10 is a generator) or fan (e.g., if electric machine 10 is a motor). The one or more shaft openings of housing 12 and shaft 14 may be spaced by an air gap sized to permit clearance between housing 12 and shaft 14 during operation (e.g., accommodating thermal expansion, vibration, and/or other varying conditions). Housing 12 may include a first end 11A and a second end 11B (collectively "ends 11"). Depending on a configuration of electric machine 10, one of ends 11 may be a drive end proximal to the rotary mechanical device, while the opposite of ends 11 may be a non-drive end. Electric machine 10 includes a stator 16 coupled to housing 12 and a rotor 18 coupled to shaft 14. In examples in which electric machine 10 is an electric generator, rotor 18 may be configured to produce a dynamic magnetic field that induces a current in stator 16. In examples in which electric machine 10 is an electric motor, stator 16 may be configured to produce a dynamic magnetic field that induces a magnetic field in rotor 18, generating torque on shaft 14.

Electric machine 10 includes a first shaft bearing 20A and a second shaft bearing 20B (individually "shaft bearing 20" and collectively "shaft bearings 20") coupled to housing 12. For example, shaft bearings 20 may be integral shaft bearings fixed into fore and aft walls of housing 12. While only two shaft bearings 20 are shown, electric machine 10 may include any number of shaft bearings 20. Shaft bearings 20 are each configured to contact shaft 14 to support shaft 14 and permit rotation of shaft 14 around axis 13. A variety of shaft bearings may be used for shaft bearings 20 including, but not limited to, deep groove ball bearings, angular contact ball bearings, roller bearings, hybrid bearings, and the like. While illustrated as a single bearing, each of shaft bearing 20 may include one or more bearings.

Electric machine 10 includes a bearing lubrication system fluidically coupled to first and second shaft bearings 20. The bearing lubrication system is configured to lubricate first and second shaft bearings 20 using a lubricant, such as an oil or grease. A variety of lubrication systems may be used including, but not limited to, a wet sump lubrication system, a dry sump lubrication system, a circulating lubrication system, and the like. As illustrated in FIG. 1A, the bearing lubrication system may include a first sump apparatus 22A configured to lubricate first shaft bearing 20A and a second sump apparatus 22B configured to lubricate second shaft bearing 20B. Each sump apparatus 22 may include one or more sumps or oil chambers configured to receive, hold, and/or distribute lubricant to shaft bearings 20.

In some examples, the lubrication system may be a wet sump lubrication system configured to maintain one or more sumps of lubricant for shaft bearings 20. Each sump apparatus 22 may include one or more sumps configured to apply lubricant to a respective shaft bearing 20. Each of shaft bearings 20 may be configured to pick up the lubricant within the respective sump apparatus 22 and distribute the lubricant through the respective shaft bearing 20. In some examples, the lubrication system may be a dry sump lubrication system configured to maintain flow of lubricant to shaft bearings 20 and pump excess lubricant from one or more sumps. Each of shaft bearings 20 may be configured to receive sprayed or misted lubricant, such as from an injector of respective pump apparatus 22.

In some examples, the lubrication system may be a circulating lubrication system configured to pump lubricant to shaft bearing 20 or other components within housing 12 by maintaining a pressure in housing 12, filtering the lubricant, and cooling the lubricant. As such, shaft bearings 20 and/or sump apparatuses 22 may have a positive or negative pressure relative to an interior of housing 12. For example, electric machine 10 may be configured to operate at a pressure of an interior of housing 12 that is between 0 psig and about −5 psig and/or between 0 psig and about 5 psig relative to an exterior of housing 12, such as between about −0.1 psig and about −3 psig and/or between about 0.1 psig and about 2 psig. For example, a relatively low, non-zero positive or negative pressure differential may assist in sealing shaft seals 24, as pressure may improve contact of filaments of shaft seals 24 with shaft 14 and/or cause airflow to reduce lubricant travelling between filaments over time. In some examples, the lubrication system may be configured to control a pressure differential between an interior of housing 12 and the lubrication by, for example, pumping lubricant into sumps 22 at a positive pressure (e.g., a pressure of an interior of housing 12 lower than a pressure of the lubrication system) or removing lubricant from sumps 22 at a negative pressure (e.g., a pressure of an interior of housing 12 higher than a pressure of the lubrication system). Alternatively, two seals could be employed in tandem, with buffer air supplied between them to establish the air flow pressure and direction.

Each shaft bearing 20 may include a bearing chamber and a lubricant supply, such as sump apparatus 22. In some examples, the bearing chamber may be shared with a drive end shaft mechanical system (e.g., input splines and drive shaft bearings) or non-drive end shaft mechanical systems or additions (e.g., a motor gearbox, integral lubricant pump, etc.).

Electric machine 10 includes a first shaft seal 24A and a second shaft seal 24B (individually "shaft seal 24" and collectively "shaft seals 24") coupled to housing 12. First and second shaft seals 24 are each configured to substantially seal the lubricant within a respective bearing chamber of shaft bearings 20 and/or sump of sump apparatuses 22 at an air gap between housing 12 and shaft 14 and reduce or prevent contaminants, such as dirt or water, from entering housing 12. For example housing 12, shaft 14, or both, may change dimensions or position due to thermal expansion, a change in mechanical loads, or other change in operation conditions, such that the air gap may be configured to provide clearance for shaft 14 within housing 12. Lubricant may be substantially contained on a bearing side (shaft bearing 20B) of first seal 24A and a bearing side (shaft bearing 20A) of second shaft seal 24B. In some examples, shaft seals 24 may include integral seals within housing 12.

In some examples, shaft seals 24 may be brush seals. A brush seal may include a plurality of filaments configured to substantially seal the bearing chambers of shaft bearings 20 and/or sumps of sump apparatuses 22 at the air gap between housing 12 and shaft 14 at the one or more openings of housing 12. The plurality of filaments may form a non-hermetic seal that is pliable around shaft 14 and configured to substantially conform to a shape of shaft 14. In some examples, a diameter of shaft 14 may be relatively large, such that sealing the one or more openings in housing 12 using a rigid seal (e.g., labyrinth seal) may be expensive or difficult to achieve due to relatively small tolerances compared to a diameter of shaft 14. However, shaft seals 24 that include brush seals may seal such relatively large diameter shafts 14 by permitting a greater amount of variation in clearance between housing 12 and shaft 14. In some examples, a diameter of shaft 14 is greater than about ten centimeters. In some examples, a speed of shaft 14 may be relatively high, such that sealing the one or more openings in housing 12 using a rigid seal may be difficult to achieve due to high surface speed. In some examples, a surface speed of shaft 14 is greater than about 50 meters/second.

At least one of first or second shaft seals 24 includes a brush seal configured to discharge a shaft voltage-induced current from the shaft to an external ground 34 of the system. In some examples, the brush seal may include a plurality of conductive filaments configured to contact shaft 14 and discharge at least a portion of shaft voltage-induced current from electric machine 10. The plurality of conductive filaments may provide the shaft current with a low impedance path to reach external ground 34 without damaging internal motor components, such as shaft bearings 20. The plurality of conductive filaments may conduct current away from shaft bearings 20 and allow shaft current to leave electric machine 10 in a controlled fashion.

As two examples, FIG. 1A illustrates a ground current path 15A and circulating current path 15B. A current in ground current path 15A may flow from shaft 14 to housing 12 and to a ground, such as a mounting frame coupled to electric machine 10. A current along a circulating current path 15B may flow from shaft 14 to housing 12, to stator 16, and back through housing 12 to shaft 14. In either ground current path 15A or circulating current path 15B, current may flow from shaft 14 to housing 12.

To reduce or divert current flowing along ground current path 15A and/or circulating current path 15B, first shaft seal 24A and/or second shaft seal 24B may be configured to act as contacts for the currents of current paths 15A and/or 15B, thereby forming a path between shaft 14 and external ground 34 (e.g., directly or via housing 12). As a result, less current may flow through shaft bearings 20, reducing arcing shaft bearings 20 and extending a life of shaft bearings 20.

In some examples, only one of first or second shaft seals 24 includes a brush seal configured to discharge the shaft voltage-induced current from the system. For example, shaft voltages in shaft 14 may be substantially induced by a single source, such that current may flow in a single direction along shaft 14 during operation, such as illustrated in ground current path 15A of FIG. 1A. In such examples, electric machine 10 may include one or more brush seals on a single end of shaft 14 configured to discharge current that may otherwise discharge through shaft bearing 20 corresponding to a path of the current. For example, second brush seal 24B may be configured to discharge at least a portion of current from ground current path 15A to external ground 34.

In some examples, first and second shaft seals 24 each include at least one brush seal configured to discharge the shaft voltage-induced current from shaft 14. For example, shaft voltages in shaft 14 may be induced by more than one source, such that current may flow in more than one direction and/or along more than one path, such as illustrated in ground current path 15A and circulating current path 15B of FIG. 1A. In such examples, electric machine 10 may include one or more brush seals on both ends of shaft 14 configured to discharge current that may otherwise discharge through either or both shaft bearings 20 corresponding to the various paths of the current. For example, first and second shaft seals 24A and 24B both include brush seals configured to discharge a portion of current from ground current path 15A and/or circulating current path 15B, such as if current is sufficiently high to travel in parallel paths instead of discharging from a single shaft seal 24 and/or if an overall resistance of a proximal shaft bearing 20 is lower than a single shaft seal 24.

In some examples, electric machine 10 incorporating brush seals in one or more shaft seals 24 may increase longevity of shaft bearings 20 by both sealing the lubricant into electric machine 20 and discharging shaft voltage-induced currents from electric machine 10. During operation of electric machine 10, shaft currents induced by stray voltages in shaft 14 may travel through the conductive filaments of shaft seals 24 and discharge from electric machine 10, thereby reducing a level of current in shaft 14 and, correspondingly, a likelihood of arcing in shaft bearings 20 of electric machine 10. In some instances, electric machine 10 may have reduced size and/or weight compared to electric machines that do not include shaft seals 24. For example, an electric machine may include one or more supplemental current discharge mechanisms configured to discharge shaft voltage-induced currents from shaft 14. These supplemental current discharge mechanisms may add weight or shaft length to the electric machine, and may increase complexity of maintenance of the shaft bearings, the shaft seals, or other components involving shaft 14. In contrast, shaft seals 24 may use less volume and/or may simplify maintenance or replacement by incorporating both sealing and grounding functions into a single unit.

Figure 1B:
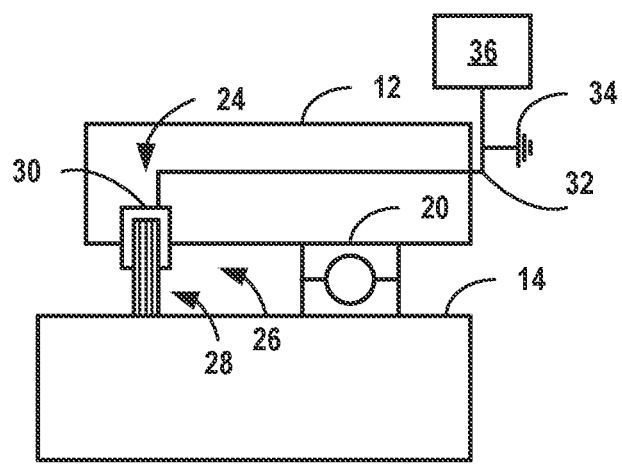
FIG. 1B is a cross-section side view diagram illustrating an example brush seal in a housing of an electric machine.

FIG. 1B is a cross-section side view diagram illustrating an example shaft seal 24 in a housing of a rotating machine, such as housing 12 of electric machine 10. For example, shaft seal 24 may be either or both shaft seal 24A and/or shaft seal 24B of FIG. 1A. Shaft seal 24 includes a brush seal 26. Brush seal 26 is configured to contact shaft 14 and form a barrier between housing 12 and shaft 14 to substantially seal lubricant within bearing chambers of shaft bearings 20 and/or sumps of sump apparatuses and substantially prevent contaminants from entering the bearing chambers of shaft bearings 20 and/or sumps of sump apparatuses 22 and prevent lubricant from entering housing 12. While illustrated as a single brush seal 26, shaft seal 24 may include more than one brush seal 26.

Brush seal 26 includes a plurality of filaments 28 in a frame 30. Plurality of filaments 28 is configured to substantially seal the lubricant within the bearing chambers or sumps of housing 12 of electric machine 10 and shaft 14 of electric machine 10. Plurality of filaments 28 may be configured with various structural and compositional properties, such as an average diameter, a shape, a modulus of elasticity, and/or a hardness, to provide a seal against shaft 14. In some examples, plurality of filaments 28 is distributed continuously around brush seal 26. For example, plurality of filaments 28 may collectively extend around a circumference of frame 30, such that plurality of filaments 28 may in combination substantially seal shaft 14 below a pressure threshold (e.g., 2 psig).

Frame 30 may be configured to position plurality of filaments 28 relative to housing 12. In some examples, frame 30 may include one or more structures configured to orient plurality of filaments 28 within the air gap between housing 12 and shaft 14, including axial angular (i.e., forming an angle along a plane parallel to axis 13) and/or radial angular (i.e., forming an angle along a plane perpendicular to axis 13) orientations. For example, while plurality of filaments 28 are illustrated in FIG. 1B as being normal to a surface of shaft 14, in some examples, at least a portion of plurality of filaments 28 may be axially angled toward shaft bearing 20 or away from shaft bearing 20. In some examples, frame 30 includes one or more systems to maintain radial pressure on plurality of filaments 28 toward shaft 14, such as springs, weights, or other passive or active mechanisms for arranging the plurality of filaments 28 to create a seal.

Brush seal 26 includes a plurality of electrically conductive filaments of plurality of filaments 28. The plurality of electrically conductive filaments is configured to contact shaft 14 and discharge a shaft voltage-induced current from shaft 14 to an external ground 34 of electric machine 10. For example, the plurality of electrically conductive filaments is configured to operate as sliding electrical contacts to carry electric charges across the sliding interface between the contact surfaces of shaft 14 and the plurality of electrically conductive filaments. The plurality of electrically conductive filaments may be configured for an electrical resistivity that is lower than corresponding shaft bearings, such as shaft bearings 20 of FIG. 1A. In some examples, an electrically conductive filament may be any filament having an electrical resistivity less than about $10^{-3}$ $\Omega \cdot m$, such as less than about $10^{-6}$ $\Omega \cdot m$.

A variety of materials may be used for forming the plurality of electrically conductive filaments, including various combinations of materials. In some examples, the plurality of electrically conductive filaments includes at least one of a metal or a conductive carbon fiber, such as carbon filaments, metal-impregnated carbon filaments, copper filaments, aluminum filaments, metal-impregnated polymers, and the like. In some examples, the plurality of electrically conductive filaments may include metal filaments. For example, metal filaments may have a relatively low electrical resistivity, may be relatively resistant to corrosion, such as due to lubricant or contaminants, and/or may operate under relatively humid conditions compared to carbon filaments. Metal filaments may also have a relatively high current density and may discharge relatively low grounding currents. In some examples, the plurality of electrically conductive filaments may include carbon filaments. For example, carbon filaments may have a relatively low tendency to flake or wear compared to metal filaments.

The plurality of electrically conductive filaments may be present at a sufficient density in brush seal 26 such that brush seal 26 may substantially discharge shaft voltage-induced currents from shaft 14. For example, the plurality of electrically conductive filaments may be present in such a structural configuration (e.g., number or surface area) and/or compositional configuration (e.g., material having electrical resistivity or conductivity) to have a current density during operation that is below a current density threshold for shaft voltage-induced currents in electric machine 10. In some examples, an average diameter of electrically conductive filaments of the plurality of electrically conductive filaments is between about 5 micrometers and about 100 micrometers.

In some examples, plurality of filaments 28 includes a plurality of non-conductive or semi-conductive filaments. For example, while conductive materials may be configured for discharging current, non-conductive or semi-conductive materials may provide better properties for sealing a rotating shaft, such as higher wear resistance, higher modulus of elasticity, lower thermal expansion coefficient, and the like. A non-conductive or semi-conductive material may include any material having an electrical resistivity greater than about $10^{-3}$ $\Omega \cdot m$, such as greater than about $10^{-5}$ $\Omega \cdot m$. A variety of materials may be used for non-conductive or semi-conductive filaments including, but not limited to, polymers, ceramics, and the like. In some examples, the plurality of non-conductive filaments includes a high temperature polymer.

In addition to having a different composition, in some examples, the plurality of non-conductive or semi-conductive filaments may be configured with different structural properties than the plurality of electrically conductive filaments. For example, the plurality of non-conductive or semi-conductive filaments may be configured for properties that improve a sealing function of the plurality of non-conductive or semi-conductive filaments, such as a smaller average diameter or greater axial angle, while the plurality of electrically conductive filaments may be configured for properties that improve or enhance a conductive function of the plurality of electrically conductive filaments.

In some examples, shaft seal 26 includes a discharge conduit 32. Discharge conduit 32 may be configured to conduct the shaft voltage-induced current from brush seal 26 to external ground 34. For example, while housing 12 may provide a discharge path from brush seal 26 to external ground 34, housing 12 may be configured with a material that is selected for properties such as strength and temperature resistance, rather than electrical resistivity or conductivity. To provide a lower resistance path to external ground 34, discharge conduit 32 may be configured with a material having a relatively low electrical resistivity, such as less than about $10^{-6}$ $\Omega \cdot m$. In some examples, discharge conduit 32 may be configured with a material having an electrical resistivity that is less than an electrical resistivity of a bulk material of housing 12, such as a copper discharge conduit 32 for an aluminum housing 12. In some examples, external ground 34 includes a mounting frame of electric machine 10.

In some examples, electric machine 10 include one or more electronics 36 configured to monitor a current in shaft seals 24. For example, the one or more electronics may be configured to measure an amount of current discharged from shaft 14 through shaft seals 24 to determine an operating status of shaft seals 24 (e.g., whether maintenance or cleaning may be required, whether shaft seals is making sufficient contact with shaft 14, etc.), an operating status of one or more components of electric machine 10 (e.g., an asymmetry of electric machine 10), or other information for which the shaft voltage-induced current from shaft 14 to shaft seals 24 may be indicative.

Figure 2A:
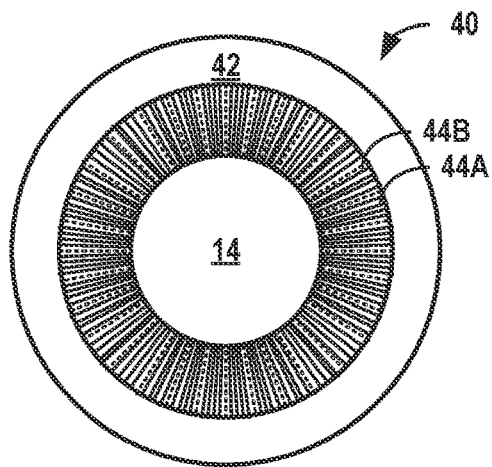
FIG. 2A is a cross-section side view diagram illustrating an example grounding brush seal having distributed conductive filaments.

Grounding brush seals described herein may include various spatial configurations of electrically conductive filaments. In some examples, the electrically conductive filaments may be circumferentially distributed discretely throughout a brush seal. FIG. 2A is a cross-section side view diagram illustrating an example grounding brush seals having distributed electrically conductive filaments. Brush seal 40 includes a frame 42 coupled to a plurality of electrically conductive filaments 44B uniformly dispersed with a plurality of non-conductive or semi-conductive filaments 44A around shaft 14. By distributing electrically conductive filaments of the plurality of electrically conductive filaments 44B circumferentially around brush seal 40, a current may be relatively evenly discharged through brush seal 40 and/or sealing properties (e.g., flexibility) of brush seal 40 may be relatively uniform.

Figure 2B:
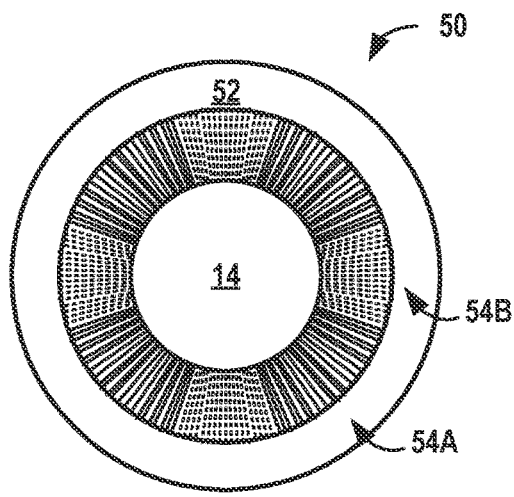
FIG. 2B is a cross-section side view diagram illustrating an example grounding brush seal having bunched conductive filaments.

In some examples, the electrically conductive filaments may be circumferentially distributed in one or more bunches throughout a brush seal. FIG. 2B is a cross-section side view diagram illustrating an example grounding brush seals having bunched electrically conductive filaments. Brush seal 50 includes a frame 52 coupled to a plurality of electrically conductive filaments 54B arranged in discrete bunches distributed circumferentially around brush seal 50 and alternating with a plurality of non-conductive or semi-conductive filaments 54A arranged in discrete bunches. By distributing electrically conductive filaments of the plurality of electrically conductive filaments 54B circumferentially around brush seal 50, the electrically conductive filaments may be relatively easy to replace or maintain and/or the current may be directed to a more desired path (e.g. in line with the nearest grounding strap).

Figure 2C:
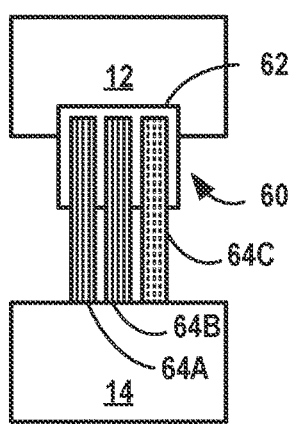
FIG. 2C is a cross-section side view diagram illustrating an example grounding brush seal having row conductive filaments.

In some examples, the conductive filaments may be axially distributed in one or more rows throughout a brush seal. FIG. 2C is a cross-section side view diagram illustrating an example grounding brush seals having row electrically conductive filaments. Brush seal 60 includes a frame 62 coupled to a plurality of rows 64A, 64B, 64C of a plurality of filaments. A plurality of electrically conductive filaments is arranged in a single row 64C of the plurality of filaments, including two rows 64A and 64B of a plurality of non-conductive or semi-conductive filaments. By distributing electrically conductive filaments of the plurality of electrically conductive filaments 64B axially through brush seal 60, the electrically conductive filaments may be relatively easy to replace or maintain (e.g., by replacing a single row) and/or various rows may be differentiated and configured for a particular sealing (e.g., by including non-conductive or semi-conductive filaments configured to substantially seal against shaft 14) or grounding function (e.g., by including conductive filaments configured to discharge shaft voltage-induced current).

Various examples have been described. These and other examples are within the scope of the following claims.

What is claimed is:

1. A system comprising:
a housing defining an axis;
a shaft positioned along the axis;
a stator coupled to the housing;
a rotor coupled to the shaft;
a first shaft bearing and a second shaft bearing coupled to the housing, wherein the first and second shaft bearings are each configured to contact the shaft to permit rotation of the shaft;
a bearing lubrication system fluidically coupled to the first and second shaft bearings, wherein the bearing lubrication system is configured to lubricate the first and second shaft bearings using a lubricant; and
a first shaft seal and a second shaft seal coupled to the housing and forming a barrier across an air gap in a shaft opening between the housing and the shaft, wherein the first and second shaft seals are each configured to substantially seal the lubricant within a bearing chamber of a respective first or second shaft bearing or sump of the bearing lubrication system, and wherein at least one of the first or second shaft seals comprises a brush seal configured to discharge a shaft voltage-induced current from the shaft to an external ground of the system.

2. The system of claim 1, wherein the brush seal comprises:
a plurality of first filaments, and
a plurality of electrically conductive filaments configured to contact the shaft and discharge the shaft voltage-induced current from the system.

3. The system of claim 2, wherein the plurality of first filaments is distributed continuously around the brush seal.

4. The system of claim 1, wherein the bearing lubrication system is a wet or dry sump lubrication system.

5. The system of claim 1, wherein the first and second shaft seals each comprises a brush seal configured to discharge the shaft voltage-induced current from the shaft.

6. The system of claim 1, wherein only one of the first or second shaft seals comprises a brush seal configured to discharge the shaft voltage-induced current from the system.

7. The system of claim 1, further comprising a discharge conduit configured to conduct the shaft voltage-induced current from the brush seal to the external ground.

8. The system of claim 7, wherein the external ground comprises a mounting frame of the system.

9. The system of claim 1, wherein the system is configured to operate at a pressure of an interior of the housing between about 0.1 psig and about 2 psig, and wherein the first and second shaft seals are each configured to substantially seal the lubricant within the bearing chamber of the respective first or second shaft bearing or sump of the bearing lubrication system at the pressure of the interior of the housing between about 0.1 psig and about 2 psig.

10. The system of claim 1, wherein a diameter of the shaft is greater than about ten centimeters or a shaft speed of the shaft is greater than about 50 meters per second.

11. The system of claim 2, wherein the plurality of first filaments is configured to seal the lubricant within the bearing chamber of the respective first or second shaft bearing or the sump of the bearing lubrication system.

12. The system of claim 2, wherein the plurality of electrically conductive filaments comprises at least one of a metal or a conductive carbon fiber.

13. The system of claim 2, wherein the plurality of first filaments comprises a plurality of non-conductive or semi-conductive filaments.

14. The system of claim 13, wherein the plurality of non-conductive or semi-conductive filaments comprises a high temperature polymer.

15. The system of claim 13, wherein the plurality of electrically conductive filaments is uniformly dispersed with the plurality of non-conductive or semi-conductive filaments.

16. The system of claim 13, wherein the plurality of electrically conductive filaments is arranged in discrete bunches distributed circumferentially around the brush seal.

17. The system of claim 13, wherein the brush seal comprises a plurality of rows of the plurality of first filaments, and wherein the plurality of electrically conductive filaments is arranged in a single row.

18. The system of claim 2,
    wherein an average diameter of the electrically conductive filaments of the plurality of electrically conductive filaments is between about 5 micrometers and about 100 micrometers, and
    wherein an average diameter of the first filaments of the plurality of first filaments is less than the average diameter of the electrically conductive filaments of the plurality of electrically conductive filaments.

\* \* \* \* \*